United States Patent [19]

Rimmeir

[11] Patent Number: 4,963,377
[45] Date of Patent: Oct. 16, 1990

[54] DEVICE FOR REMOVING PORTION OF A ROLL AND METHOD OF USING SAME

[76] Inventor: Paul Rimmeir, The Claridge, 201 S. 18th St., Apt. 2219, Philadelphia, Pa. 19103

[21] Appl. No.: 677,437

[22] Filed: Dec. 3, 1984

Related U.S. Application Data

[62] Division of Ser. No. 487,438, Apr. 23, 1983, Pat. No. 4,507,866.

[51] Int. Cl.$^5$ .............................................. A21D 13/00
[52] U.S. Cl. .................................... 426/283; 426/281; 426/479; 426/496; 426/514
[58] Field of Search ............... 426/283, 281, 479, 496, 426/514, 518, 138, 143

[56] References Cited

U.S. PATENT DOCUMENTS 1,842,576  1/1932  Bemis .................................. 426/497
3,937,850  2/1976  Farha et al. .......................... 426/514

OTHER PUBLICATIONS

Family Circle Cooking, Rockville House Publishers, Inc., Rockville Centre, N.Y., 1972 p. 1693.
Food Industries "Assembly Line Makes 'Mechanized' Sandwiches", Jul. 1949 62 (vol. p. 900)and 63 (vol. p. 901).

Primary Examiner—Marianne Cintins
Attorney, Agent, or Firm—Caesar, Rivise Bernstein, Cohen & Pokotilow, Ltd.

[57] ABSTRACT

A device for removing a portion of a roll, comprising an elongated hollow shaft having a handle at one end thereof. The other end is formed into two separated jaws, with one jaw extending beyond the other jaw. The edges of the jaws are sharpened and serrated. The device is inserted in an elongated roll, wiggled with the roll, and a portion of the soft interior of the roll is then removed. Sandwich filling, such as hot meat balls, luncheon meats, cheese, vegetables, or any mixture of the same, is then inserted into the roll, and tamped in place. The invention also contemplates the method of removing a portion of the roll and filling the roll to from a sandwich.

10 Claims, 2 Drawing Sheets

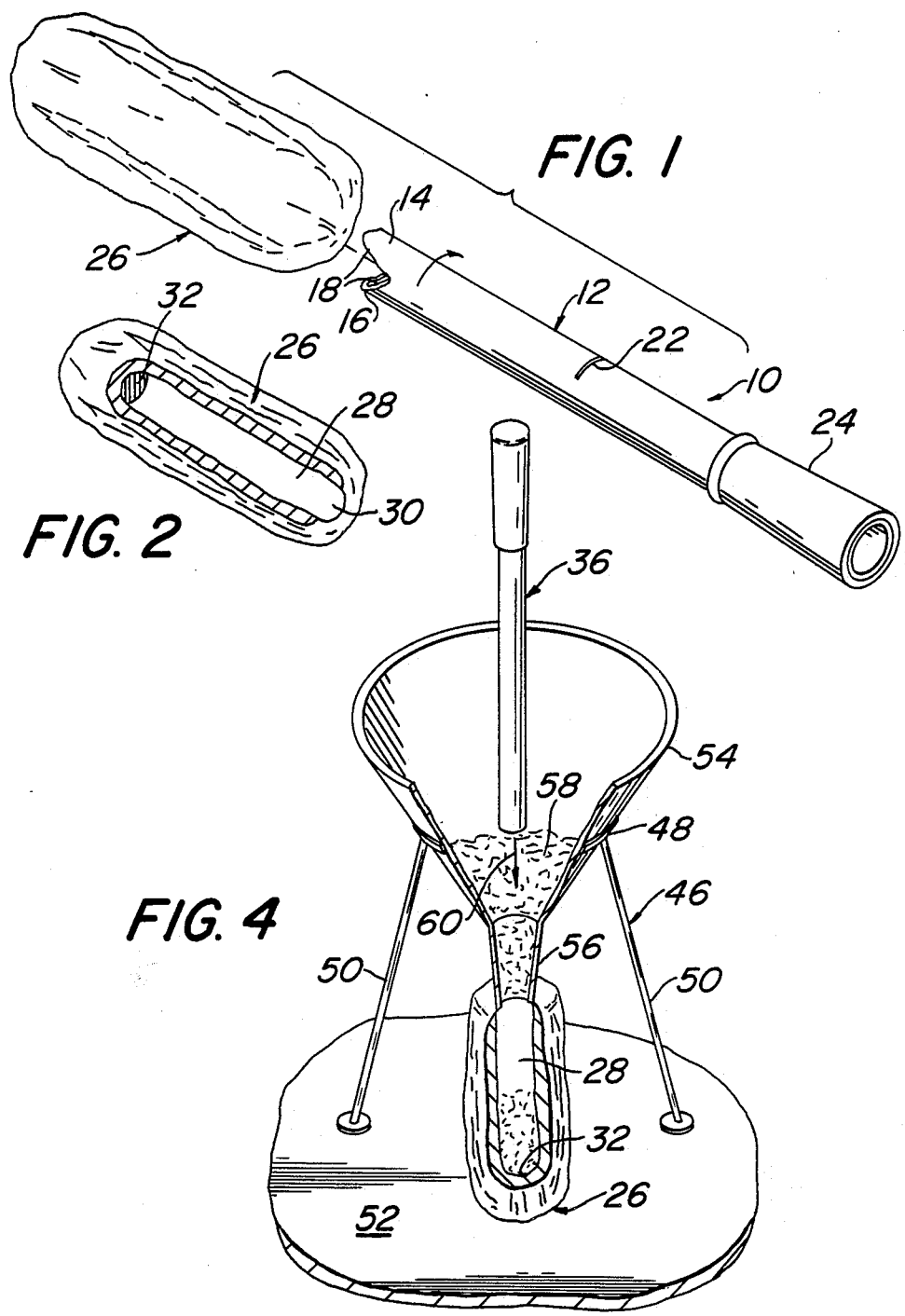

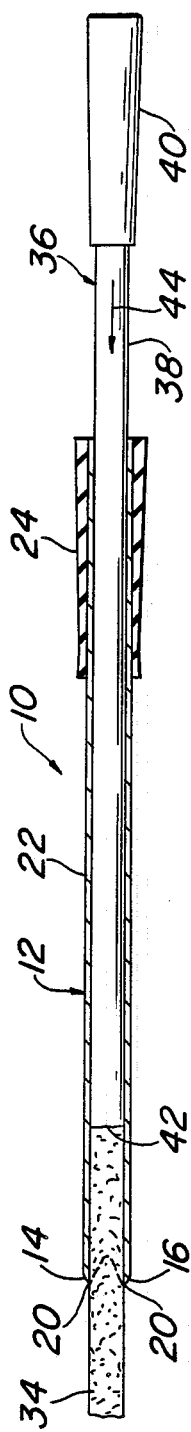
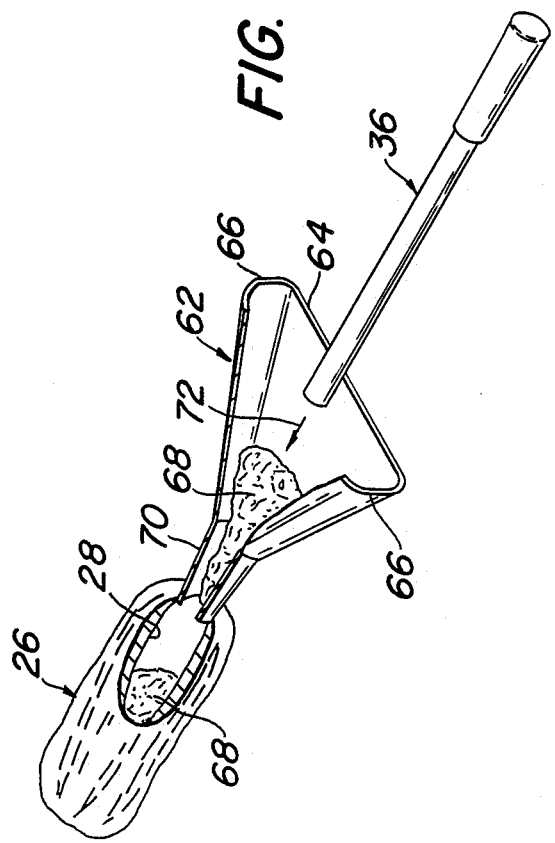

DEVICE FOR REMOVING PORTION OF A ROLL AND METHOD OF USING SAME

This application is a division of serial number 487,438 filed Apr. 23, 1983, now U.S. Pat. No. 4,501,866

This invention relates to a device for removing portion of a roll, and more particularly, to a device for removing a tubular core from an elongated roll and the method of filling the roll, in order to form a sandwich.

It has long been known to make sandwiches by slicing rolls in half, and placing sandwich fillings between the two halves of the rolls. It has been determined that one of the problems with forming sandwiches from rolls in this manner is that the sandwiches are messy to eat, especially where the sandwich fillings are partially liquid. Thus, where sandwich fillings contain sauce for meat balls or sausage, oil, cole slaw, etc., the liquid portion of the sandwich fillings will drip from between the two sections of the roll when the sandwich is eaten. Additionally, where the sandwich fillings are hot, as in the case of meat balls or sausage in a hot sauce, the filling will quickly cool because of the exposure of the filling to the ambient air as the sandwich is eaten.

It has been found that the crust of the roll and the soft inner portion of the roll provide an excellent insulator to maintain the contents of the sandwich hot. Thus, if the exposure of the contents of the sandwich to the outside air is kept at a minimum, the filling of the sandwich can be maintained relatively hot until the sandwich is entirely eaten.

Utilizing the device and method of this invention, a sandwich can be formed in a roll, and the contact of the filling of the sandwich with the ambient air is kept at a minimum. This facilitates the storage of the sandwich, and permits the preparation of the sandwich in a busy restaurant long prior to the time that the sandwich is served.

Another advantage of the device and method of this invention is that the filling of the sandwich is encapsulated within the crust of the roll, and the filling will not drip when the sandwich is being eaten. This facilitates the eating of a sandwich which would otherwise be extremely difficult and messy to eat. Thus, there will be no dripping of any of the liquid contents of the filling during the time the sandwich is eaten.

It is accordingly an object of this invention to provide a novel device for removing a portion of a roll.

It is another object of this invention to provide a novel method of forming a sandwich in a roll.

These and other objects of this invention are accomplished by providing a device for removing a portion of a roll, comprising an elongated tubular shaft, said shaft being formed into a pair of spaced jaws at one end thereof, with each of said jaws having sharpened edges, whereby said device may be inserted into a roll and rotated, to thereby sever a portion of the interior of the roll from the roll.

Other objects and many of the attendant advantages of this invention will be readily appreciated as the same becomes better understood by reference to the following detailed description when considered in connection with the accompanying drawing wherein:

FIG. 1 is an exploded perspective view showing the device of this invention and a roll in which the device is to be inserted;

FIG. 2 is a perspective view of the roll, partially broken away, and showing a portion of the roll removed by the device of this invention;

FIG. 3 is a side elevational view, partially in section, showing the device of this invention having a removed plug of the roll therein;

FIG. 4 is a perspective view, partially broken away, showing one method of filling the roll to form a sandwich; and, FIG. 5 is a perspective view, partially broken away, showing an alternative method of filling the roll to form a sandwich.

Referring now in greater detail to the various figures of the drawing wherein like reference characters refer to like parts, a device for removing a portion of a roll embodying the present invention is generally shown at 10 in FIG. 1. Device 10 basically comprises a tubular metal shaft 12, having a V-shaped notch cut in one end thereof, thereby forming an upper jaw 14 and a lower jaw 16.

The edges of jaws 14 and 16 are sharpened and serrated, as indicated at 18 in FIG. 1, and in addition, each of the jaws is tapered to terminate in a piercing end 20 (FIG. 3). A groove 22 is formed in the outer surface of shaft 12, as seen in FIG. 1. A handle 24 is placed on shaft 12, on the end opposite jaws 14 and 16. Handle 24 can be formed from plastic or rubber, and held in place by a friction fit or adhesive. As seen in FIG. 3, the forward end of upper jaw 14 projects forwardly of the forward end of lower jaw 16.

Device 10 is used to remove a portion of the interior dough of a roll, which is generally shown at 26 in FIG. 1. Roll 26 is preferably an elongated roll having a crisp crust and soft interior, such as a French roll or Italian roll, which is used in making hoagies or submarine sandwiches. Device 10 is used by piercing one end of the roll 26 with the tapered ends 20 and forcing the device into the roll until the end of the roll is aligned with groove 22. The purpose of groove 22 is to serve as an indicium for limiting the penetration of device 10 in the roll. Thus, when the end of the roll is aligned with groove 22, the device will have been inserted a sufficient length to remove a substantial portion of the interior of the roll, while at the same time, not passing through the opposite end of the roll. Although the device 10 can be made in any suitable diameter, a preferred diameter is one inch (2.54 cm).

After the end of the roll has been pierced, the device 10 is advanced within the roll by alternately rotating the device in opposite directions, while at the same time forcing the device into the roll. In doing this, the serrated cutting edges 18 sever the interior bread of the roll from the remainder of the roll. Once the insertion has been completed up to the groove 22, the device 10 is rotated 360°, and then is tilted relative to the roll. This severs the plug of bread contained in the tubular shaft 12 from the balance of the roll. The severing is facilitated by having the end of jaw 14 extend beyond the end of jaw 16. After the severing, the device 10 is then withdrawn from the roll.

The condition of the roll 26 after the device 10 has been removed is shown in FIG. 2. As seen therein, the device 10 will remove a plug of the bread from the interior of the roll, leaving a substantially cylindrical bore 28, having an opening 30 at one end. The bottom of the bore is closed by the bread remaining in the roll, as indicated at 32.

Referring to FIG. 3, the plug of bread or dough removed from the roll is generally shown at 34. When the plug 34 is removed from the roll, it is totally enclosed within the hollow shaft 12. A plunger 36 (FIG. 3) is used for removing the plug 34. Plunger 36 comprises a solid, cylindrical rod 38 having a handle 40 secured thereon. Rod 38 can be formed from wood or plastic, and the handle 40 can be formed from plastic or rubber, and secured in place by friction fit or adhesive.

In use, leading end 42 of plunger 36 is inserted in the rear end of shaft 12, and pushed forwardly, in the direction of arrow 44. Continued forward movement of the plunger forces the plug 34 from tubular shaft 12. After the plug 34 has been removed, the plunger 36 is withdrawn, and device 10 is again ready for use on another roll.

The combination of device 10 and plunger 36 is similar to a fish deboner, which is presently commercially available. However, on the fish deboner, jaws similar to jaws 14 and 16 are coextensive in length, and do not contain serrated cutting edges. Additionally, the fish deboner is known for use only in deboning fish. The fish deboner does not have the groove 22 on the shaft thereof, as does the device of this invention.

After the bore 28 has been formed in the roll 26, the roll is ready to be filled with a sandwich filling. Any filling material previously used in sandwiches can be used in carrying out this invention. By way of non-limiting example, the filling material can be hot meat balls in a sauce, hot sausage in a sauce, luncheon meats, cheeses, lettuce, tomato, or any combination of these materials. Where the filling material is the normal material used in making a hoagie or submarine sandwich, the filling material will include luncheon meats, cheese, shredded lettuce, onions, peppers, oil and oregano.

One method for filling the roll is shown in FIG. 4. As seen therein, a funnel support, generally shown at 46, can be used. The funnel support 46 includes a ring 48 supported by three dependent legs 50 (two shown in FIG. 4 for the purpose of clarity). The legs can be placed on any suitable supporting surface, such as countertop 52. A funnel 54, having a spout 56, is then placed within ring 48, which supports the funnel.

After the funnel has been assembled in the position shown in FIG. 4, a roll 26 having the bore 28 formed therein, is then placed vertically beneath the spout 56, with the spout entering the opening 30 in the roll. A predetermined amount of sandwich filling material 58 is then placed within the funnel. The filling material 58 can be any of the filling materials described above, or any other filling material usually used in making a sandwich. The plunger 36 is then pushed downwardly, in the direction of arrow 60, against the filling material 58, thereby forcing the filling material into the bore 28 of roll 26. By suitable tamping, the filling material will all be forced into the bore 28 thereby completely filling the bore.

After the roll has been completely filled, the funnel 54 is removed from the top of the roll, and the roll, with the filling material therein, can then be eaten. In a high-volume restaurant, the filled rolls can be stored in an inclined position, with the hole 30 being uppermost, prior to the serving of the sandwiches. In this way, none of the liquid contents of the roll will drip from the roll prior to the time that it is eaten. Additionally, the roll can be served on an inclined container so that nothing will drip from the roll prior to the patron's consuming the same.

An alternate method of filling the roll 26 is shown in FIG. 5. Utilizing this method, the roll is placed on a horizontal surface, and the filling material is added horizontally into the roll. To accomplish this, a filling plate, generally shown at 62, is utilized. Filling plate 62 comprises a base plate 64 having upwardly projecting and curved side walls 66. The walls 66 are partially broken away in FIG. 5, for the purpose of clarity. However, it should be understood that their tops project toward each other, but are sufficiently spaced to enable the placing of sandwich filling material 68 thereon.

The plate 64 tapers inwardly from its rear edge toward its front. The plate terminates in a substantially cylindrical, but slightly tapered, spout 70. Although the edges of spout 70 are contiguous in actual construction, for the purpose of clarity, the spout has been broken away in FIG. 5.

In use, the spout 70 is placed in the opening of roll 26, and the sandwich filling material 68 that had been placed on plate 64 is pushed into bore 28 of roll 26 by plunger 36, in the direction of arrow 72. Here again, a predetermined amount of filling material 68 is placed on plate 64, and the entire amount of filling material is tamped into roll 26 by plunger 36. After the roll has been completely filled, filling plate 62 is removed, and the roll and its contents can then be vended and consumed.

The method shown in FIG. 5 is particularly adapted for making hoagies or submarine sandwiches. Thus, the luncheon meat forming a part of the filling can first be placed on the plate 64, and the other filling ingredients, such as shredded lettuce, onions, peppers, cheese, seasoning and oil can then be placed on the luncheon meat. The luncheon meat can then be rolled and forced into the spout 70, from which it can be tamped into the roll 26. Since the top of plate 64 is accessible between curved walls 66, the placing of the sandwich filling on the plate and the rolling of the same are easily accomplished.

Once the roll has been filled by either of the methods of FIGS. 4 or 5, or by any other appropriate method, the sandwiches can then be vended. They are easily stored in an inclined position, prior to vending, and none of the contents will drip from the rolls during storage. Since the contents of the roll have only minimal contact with the atmosphere, through opening 30 in the roll, any heated contents of the roll will remain relatively hot until the roll is consumed.

When consuming the roll and its contents, the roll will be held vertically, and this will prevent any of the contents from dripping on the patron. Thus, since the sides and bottom of the roll will remain uncut, there is no opening in the roll which would permit the dripping of any of the contents. Since the preferred rolls used for carrying out this invention have a crisp crust, a substantial period of time will pass before any of the liquid contents could possibly pass through the roll. Additionally, the soft interior of the roll will absorb any liquid contents within the roll.

In the embodiment of the invention shown, a single groove 22 has been placed on the exterior of device 10. Where all of the rolls used in a given restaurant are of approximately the same length, all that is necessary is to provide the single groove 22. However, where the restaurant will be filling rolls of various lengths, a plurality of grooves 22 can be used. Thus, the user of the device will select the appropriate groove for determining the amount of insertion of the device 10 into the roll. The amount of insertion can easily be determined by aligning one of the grooves with the roll to determine how deeply the device should be inserted into the roll to leave a substantial base within the bore of the roll. A base of one inch (2.54 cm) is more than adequate to carry out this invention.

Without further elaboration, the foregoing will so fully illustrate my invention, that others may, by applying current or future knowledge, adopt the same for use under various conditions of service.

I claim:

1. A method of forming a sandwich in an unsplit roll comprising inserting an elongated tubular shaft having a longitudinal axis into one end of said roll, advancing the shaft into said roll to a predetermined penetration, rotating said shaft about said axis and thereafter tilting said shaft with respect to said roll to sever a plug of bread of said roll contained within the shaft from the balance of the roll, withdrawing the shaft and the plug of bread contained therein from the roll to produce a hollow roll having a single opening at the end thereof, and filling the roll through said opening with sandwich filling material.

2. The method of claim 1, wherein said shaft has an indicium on the outer surface thereof, said indicium serving as a guide for determining the amount of penetration of said shaft into said roll and wherein said predetermined penetration is shown by the position of the end of said roll with respect to said indicium.

3. The method of claim 1, wherein the penetration of said shaft into said roll terminates approximately 1 inch of the opposite end of the roll.

4. The method of claim 1, wherein the sandwich filling material is inserted into the roll through the use of a spout.

5. The method of claim 4, wherein said spout is positioned on a funnel, with the filling material being placed in the funnel and injected through the spout into the roll.

6. The method of claim 4, wherein said spout is positioned on a filling plate, and wherein the filling material is placed on the filling plate and injected into the roll from the filling plate through the spout.

7. The method of claim 1, and further including tamping the filling material in the roll, whereby all of said filling material is contained within the roll.

8. The method of claim 1, wherein the filling material is heated.

9. The method of claim 7, wherein the filling material comprises meat balls in a sauce.

10. The method of claim 1, wherein the filling material comprises one or more ingredients selected from the group consisting of luncheon meats, cheese, lettuce, tomatoes, onions, peppers, oil and seasoning.

* * * * *